US008292977B2

(12) United States Patent
Suda et al.

(10) Patent No.: US 8,292,977 B2

(45) Date of Patent: Oct. 23, 2012

(54) SYSTEM FOR CONTROLLING CIRCULATORY AMOUNT OF PARTICLES IN CIRCULATING FLUIDIZED BED FURNACE

(75) Inventors: Toshiyuki Suda, Koto-ku (JP); Yoshiaki Matsuzawa, Koto-ku (JP); Toshiro Fujimori, Koto-ku (JP)

(73) Assignee: IHI Corporation, Tokyo (JP)

( * ) Notice: Subject to any disclaimer, the term of this patent is extended or adjusted under 35 U.S.C. 154(b) by 674 days.

(21) Appl. No.: 12/526,598

(22) PCT Filed: Mar. 2, 2007

(86) PCT No.: PCT/JP2007/000160

§ 371 (c)(1), (2), (4) Date: Aug. 10, 2009

(87) PCT Pub. No.: WO2008/107929

PCT Pub. Date: Sep. 12, 2008

(65) Prior Publication Data

US 2010/0024297 A1 Feb. 4, 2010

(51) Int. Cl.

*B01J 19/00* (2006.01)

*B01J 8/18* (2006.01)

(52) U.S. Cl. .............. 48/61; 48/76; 48/127.9; 48/127.1; 48/197 R; 48/116; 48/75; 48/63; 48/203; 48/214 R; 48/215; 422/139; 422/140; 422/141; 422/142; 422/143; 422/144; 422/145; 422/146; 422/147; 422/105; 422/106; 422/107; 422/108; 422/110; 422/111; 422/112; 110/230

(58) Field of Classification Search ................. 48/127.9, 48/127.1, 61, 76, 75, 63, 203; 422/139–147, 422/105–108, 110–112; 110/230

See application file for complete search history.

(56) References Cited

U.S. PATENT DOCUMENTS

| | | | | |
|---|---|---|---|---|
| 4,324,620 | A * | 4/1982 | Ito et al. | 202/89 |
| 7,331,299 | B2 * | 2/2008 | Miyoshi et al. | 110/245 |
| 2004/0045272 | A1 * | 3/2004 | Miyoshi et al. | 60/39.12 |

(Continued)

FOREIGN PATENT DOCUMENTS

| | | |
|---|---|---|
| JP | 3-177511 | 8/1991 |
| JP | 5-331516 | 12/1993 |

(Continued)

*Primary Examiner* — Kaity V. Handal

(74) *Attorney, Agent, or Firm* — Oblon, Spivak, McClelland, Maier & Neustadt, L.L.P.

(57) ABSTRACT

The invention has its object to arbitrarily adjust an amount of particles to be circulated without changing a flow rate of a gasification agent to thereby enhance gasification efficiency in a fluidized bed gasification furnace.

The fluidized bed gasification furnace 107 comprises first and second chambers 113 and 114 in communication with each other in a fluidized bed 105. The hot particles 102 separated in the separator 104 and raw material M are introduced into the first chamber 113. The particles 102 introduced from the first chamber 113 through interior in the fluidized bed 105 to the second chamber 114 are supplied in an overflow manner to the fluidized bed combustion furnace 100. A first pressure controller 121 is provided to control the resultant gas induction means 116 such that the pressure in the first chamber 113 is kept to preset pressure 120; and a second pressure controller 124 is provided to control the exhaust gas induction means 118 such that difference between pressure in the first and second chambers 113 and 114 is equal to the preset differential pressure 123, so that the fluidized bed 105 in the first chamber 113 is controlled in height to control an amount of particles 102 to be circulated.

8 Claims, 6 Drawing Sheets

U.S. PATENT DOCUMENTS

2005/0144844 A1* 7/2005 Miyoshi et al. ............ 48/102 R

FOREIGN PATENT DOCUMENTS

| | | | |
|---|---|---|---|
| JP | 2001-289406 | | 10/2001 |
| JP | 2004-132621 | | 4/2004 |
| JP | 2005-41959 | | 2/2005 |
| JP | 2005-274015 | | 10/2005 |
| JP | 2007112873 | * | 5/2007 |

* cited by examiner

SYSTEM FOR CONTROLLING CIRCULATORY AMOUNT OF PARTICLES IN CIRCULATING FLUIDIZED BED FURNACE

TECHNICAL FIELD

The present invention relates to an system for controlling a circulatory amount of particles in a circulating fluidized bed furnace wherein particles are circulated between a fluidized bed combustion furnace for heating of the particles and a fluidized bed gasification furnace for gasification of raw material through heating of the raw material by the heated hot particles.

BACKGROUND ART

Conventionally known are circulating fluidized bed boilers as shown in References 1 and 2, JP 2005-274015A and JP 2004-132621A, respectively. FIG. 1 shows a circulating fluidized bed boiler of Reference 1 comprising a fluidized bed combustion furnace 1 for heating of particles (sand) through fluidized combustion by supply of fuel A into a fluidized bed of the particles fluidized through blowing-in of air, a separator 5 in the form of a cyclone for introduction of burnt gas 2 from a top of the furnace 1 and separation of the burnt gas into hot particles 3 and exhaust gas 4, a particle storage 7 for storage of the hot particles 3 separated in the separator 5 and introduced through a downcomer 5*a*, the stored particles 3 being circulatorily supplied via particle supply means 6 in the form of a so-called J- or L-valve type communicating pipe 6*a* to a lower portion of the fluidized bed combustion furnace 1, a heat transmission portion 8 as boiler for recovery of heat from the exhaust gas 4 and a bag filter 9 for removal of ash from the gas 4.

The particle storage 7 is supplied with air 14 from below by air supply means 10 to form a fluidized bed 11. The particle supply means 6 in FIG. 1 comprises the J- or L-valve type communicating pipe 6*a* with a lower end connected to the inside lower portion of the fluidized bed combustion furnace 1 and an upper end opened at 12 into the fluidized bed adjacent to a bottom of the particle storage 7, thus providing a backflow preventive structure preventing the fluid gas in the furnace 1 from flowing back into the separator 5. The communicating pipe 6*a* is provided with a movable flow rate controller 13 adjacent to the opening 12 to control a circulatory amount of particles to the fluidized bed combustion furnace 1.

In the fluidized bed combustion furnace 1 in FIG. 1, the particles are heated by fluidized combustion through supply of air and fuel A; burnt gas 2 from the furnace 1 is introduced into the separator 5 where it is separated into hot particles 3 and exhaust gas 4, the former being supplied to the particle storage 7. Then, the particles 3 in the particle storage 7 is sequentially taken out by a predetermined amount by the J- or L-valve type communicating pipe 6*a* to be circulatorily supplied to the fluidized bed combustion furnace 1 where the particles are heated again. In this connection, the circulatorily supplied amount of the particles 3 from the particle storage 7 to the fluidized bed combustion furnace 1 is controlled by the flow rate controller 13 provided adjacent to the opening 12 of the communicating pipe 6*a*. According to the construction with the particle storage 7 and the fluidized bed combustion furnace 1 connected together through the J- or L-valve type communicating pipe 6*aj*, the fluid gas in the fluidized bed combustion furnace 1 can be prevented from flowing back into the separator 5.

However, the circulatory amount of the particles 3 taken out through the communicating pipe 6*a* from the particle storage 7 into the fluidized bed combustion furnace 1 is relatively small, and cannot be controlled to be increased since the flow rate controller 13 serves only for throttling a flow passage in the communicating pipe 6*a*; thus, the circulatory amount of the particles 3 cannot be controlled over a larger control range. The flow rate controller 13, which has a movable portion required to moved within the communicating pipe 6*a* for control of the circulatory amount of the particles 3, requires countermeasure to high temperature and therefore is disadvantageously complicated in structure.

FIG. 2 shows a circulating fluidized bed boiler according to Reference 2 which is substantially identical in structure with that shown in FIG. 1, particles 3 from a separator 5 being introduced through a downcomer 5*a*' into below a surface layer of a fluidized bed 11 in a particle storage 7, thus providing a backflow preventive structure for preventing fluid gas in a fluidized bed combustion furnace 1 from flowing back into the separator 5. The fluidized bed 11 in the particle storage 7 at the surface layer thereof is connected to the fluidized bed combustion furnace 1 at a lower position thereof through particle supply means 6 in the form of a slanted pipe 6*b*, the particles 3 in the surface layer of the fluidized bed 11 overflowing through an upper end of the slanted pipe 6*b* to be circulatorily supplied to the lower portion of the fluidized bed combustion furnace 1. In the system shown in FIG. 2, a supplied amount of air 14 to the particle storage 7 by air supply means 10 is controlled to vary in height the surface layer of the fluidized bed 11 (layer height), thus controlling the circulatory amount of the particles 3 from the particle storage 7 to the fluidized bed combustion furnace 1.

According to the system in FIG. 2, the supplied amount of air 14 to the particle storage 7 is controlled to vary in height the surface layer of the fluidized bed 11 to thereby control the circulatory amount of the particles 3 from the particle storage 7 to the fluidized bed combustion furnace 1, so that the circulatory amount of the particles 3 can be controlled easily and over a wider control range.

Recently, there has been proposed a circulating fluidized bed furnace so-called twin tower type gasification furnace and comprising a fluidized bed combustion furnace and a fluidized bed gasification furnace. The circulating fluidized bed furnace is disclosed for example in Reference 3 (JP 2005-41959A).

FIG. 3 shows the circulating fluidized bed furnace in Reference 3 comprising a fluidized bed combustion furnace 100 for heating of particles through combustion of char in a fluidized bed supplied with air, a separator 104 for introduction of burnt gas 101 from the furnace 100 and separation of the same into hot particles 102 and exhaust gas 103 and a fluidized bed gasification furnace 107 for introduction of a gasification agent 109 such as steam and of the hot particles 102 separated in the separator 104 through a downcomer 104*a* and for take-out of resultant gas 106 through gasification of raw material M in the fluidized bed 105, using the particles 102 as heat source.

The fluidized bed gasification furnace 107 in FIG. 3 comprises an introduction portion 107*a* for introduction of the hot particles 102 from the separator 104, a gasification portion 107*b* for introduction and gasification of raw material M, a lower communicating portion 108 for communication between the portions 107*a* and 107*b* at a lower portion in the fluidized bed 105 for allowing movement of the particles 102, and a gasification agent box 110 extending below the portions 107*a*, 107*b* and 108 for supply of a gasification agent 109 such as steam. The lower communicating portion 108 provided in the fluidized bed 105 provides a backflow preventive structure for preventing the fluid gas in the fluidized bed combustion furnace 100 from flowing back into the separator 104.

Arranged between the gasification portion 107*b* and the fluidized bed combustion furnace 100 is particle supply means 111 comprising an L-shaped portion 111*a* connected at its upper end to an upper layer portion of the fluidized bed 105 in the gasification portion 107*b* and a riser portion 111*b* rising again from a lower end of the L-shaped portion 111*a* and connected to a lower portion of the fluidized bed combustion furnace 100, thus providing a backflow preventive structure for preventing the fluid gas in the fluidized bed combustion furnace 100 from flowing back into the gasification portion 107*b*. In FIG. 3, reference numeral 10*a* denotes supplementary fuel supplied to the fluidized bed combustion furnace 100 as needs demand.

In the circulating fluidized bed furnace as shown in FIG. 3, it is required to enhance gasification efficiency of the raw material M in the fluidized bed gasification furnace 107 by increasing a circulatory amount of particles 102 between the furnaces 107 and 100 and to increase a production amount of resultant gas 106 by increasing a gasification throughput of the raw material M.

[Reference 1] JP 2005-274015A

[Reference 2] JP 2004-132621A

[Reference 3] JP 2005-41959A

SUMMARY OF THE INVENTION

Problems to be Solved by the Invention

However, the circulating fluidized bed furnace shown in FIG. 3, which conducts the gasification through supply of a the gasification agent 109 such as steam to the fluidized bed gasification furnace 107, cannot adopt a mode in the circulating fluidized bed boiler shown in FIG. 2 where the circulatory amount of the particles is controlled through control of the supplied amount of air 14 to the particle storage 7. More specifically, when the flow rate of the gasification agent 109 (steam) supplied to the fluidized bed gasification furnace 107 in FIG. 3 is varied to control the circulatory amount of the particles 102, then the gasification reaction in the furnace 107 varies, disadvantageously resulting in variation in properties of the resultant gas 106 taken out as product from the furnace 107.

To overcome this, it is required that the circulatory amount of the particles from the fluidized bed gasification furnace to the fluidized bed combustion furnace 100 can be varied while the supplied amount of the gasification agent 109 to the fluidized bed gasification furnace 107 is kept constant without change.

The invention was made in view of the above problems and has its object to provide an system for controlling a circulatory amount of particles in a circulating fluidized bed furnace which can arbitrarily control the circulatory amount of the particles without varying a flow rate of a gasification agent to thereby enhance gasification efficiency in a fluidized bed gasification furnace.

Means or Measures for Solving the Problems

The invention is directed to a system for controlling a circulatory amount of particles in a circulating fluidized bed furnace wherein the particles are introduced together with char produced through gasification of raw material are introduced into a fluidized bed combustion furnace to heat the particles through fluidized combustion of the char, burnt gas taken out from the fluidized bed combustion furnace by exhaust gas induction means being introduced into a separator where the gas is separated into exhaust gas and the particles, the separated hot particles being supplied to a fluidized bed gasification furnace supplied with the raw material and a gasification agent to thereby conduct gasification of the raw material in a fluidized bed, gas produced through gasification of the raw material being taken out from the fluidized bed gasification furnace by resultant gas induction means, the particles and char produced through the gasification of the raw material being circulated to the fluidized bed combustion furnace, said system comprising said fluidized bed gasification furnace partitioned by partition means into first and second chambers in communication with each other at a lower communication portion in the fluidized bed, the hot particles from the separator and the raw material being introduced into the first chamber, said second chamber for supplying the char and the particles introduced from said first chamber via the lower communicating portion below the partition means to the fluidized bed combustion furnace through overflow, a first pressure sensor for detecting pressure in the first chamber, a second pressure sensor for detecting pressure in the second chamber, a first pressure controller for controlling the resultant gas induction means so as to keep the pressure in the first chamber to preset pressure and a second pressure controller for controlling the exhaust gas induction means so as to make difference in pressure between the first and second chambers equal to preset differential pressure, whereby the fluidized bed in the first chamber is adjusted in height to control the circulatory amount of the particles.

When the first chamber is a gasification chamber of the raw material, the gas produced through the gasification in the gasification chamber can be taken out by the resultant gas induction means at the preset pressure and the particles and the char produced through the gasification are introduced into the second chamber through the lower communicating portion below the partition means.

When the first and second chambers are a pretreatment chamber for raw material and a gasification chamber for the pretreated raw material, respectively, the processed gas produced in the pretreatment in the pretreatment chamber is taken out at the preset pressure by the processed gas induction means, the pretreated raw material and the particles being introduced into the gasification chamber through the lower communicating portion below the partition means, gas produced through the gasification in the gasification chamber being taken out at a constant take-out flow rate by the resultant gas induction means.

The processed gas may be steam produced through heating of the raw material.

The processed gas may be pyrolysis gas produced through heating of the raw material.

The pyrolysis gas may be supplied as fuel for heating of the particles to the fluidized bed combustion furnace.

The fluidized bed combustion furnace may be provided with a particle supply device for supply of new particles.

The fluidized bed combustion furnace may be provided with a particle take-out device for take-out of the particles.

Effects of the Invention

The fluidized bed gasification furnace comprises the first chamber for introduction of the raw material and the hot particles separated in the separator and the second chamber for supplying the particles introduced from the first chamber via the lower communicating portion below the partition means to the fluidized bed combustion furnace through overflow, the first pressure controller being provided to control the resultant gas induction means so as to keep the pressure in the first chamber to the preset pressure, the second pressure controller being provided to control the exhaust gas induction means so as to make difference in pressure between the first and second chambers equal to the preset differential pressure, the circulatory amount of the particles being controlled by adjusting in height the fluidized bed in the first chamber, so that obtainable is an excellent effect or advantage that, without changing the supplied amount of the gasification agent to the fluidized bed gasification furnace, the circulatory amount of the particles can be arbitrarily adjusted to arbitrarily enhance gasification efficiency in the fluidized bed gasification furnace.

EXPLANATION OF THE REFERENCE NUMERALS

Figure 1:
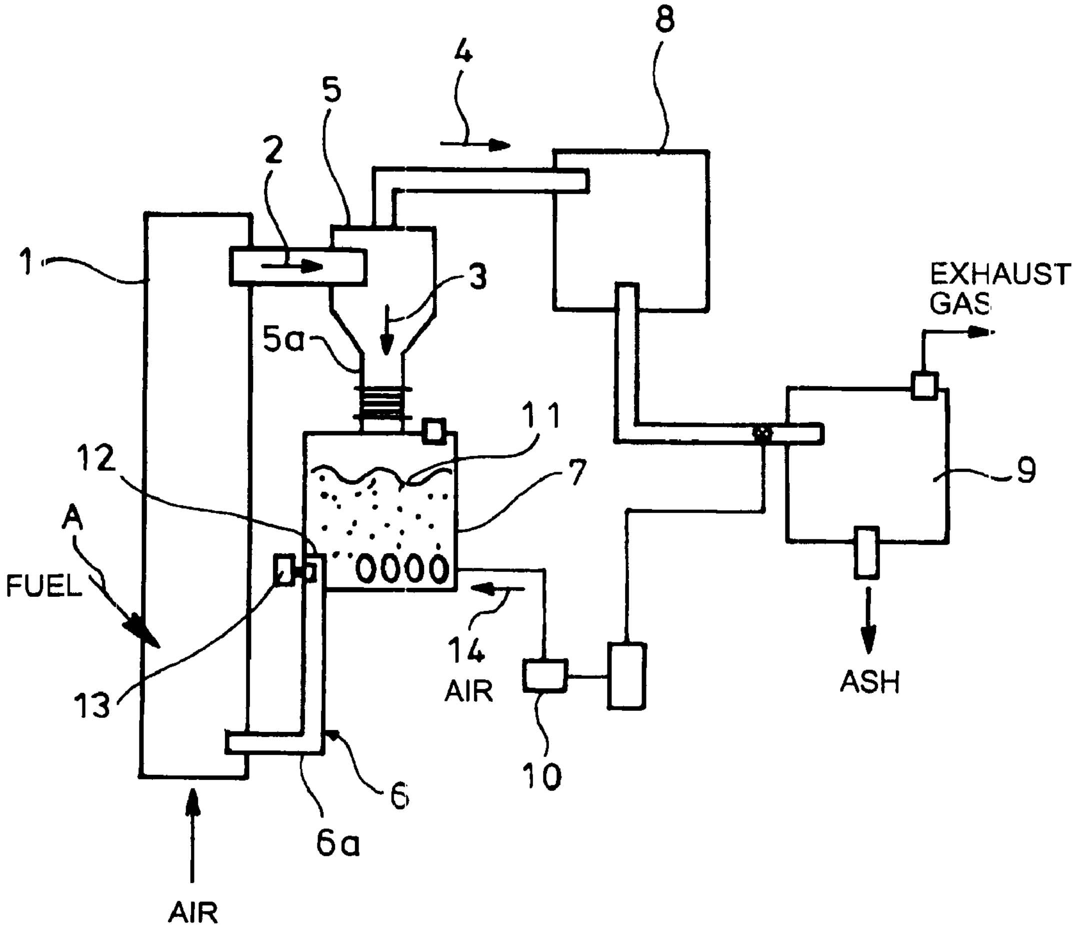
FIG. 1 PRIOR ART
FIG. 1 is a side view showing a conventional circulating fluidized bed boiler.
Figure 2:
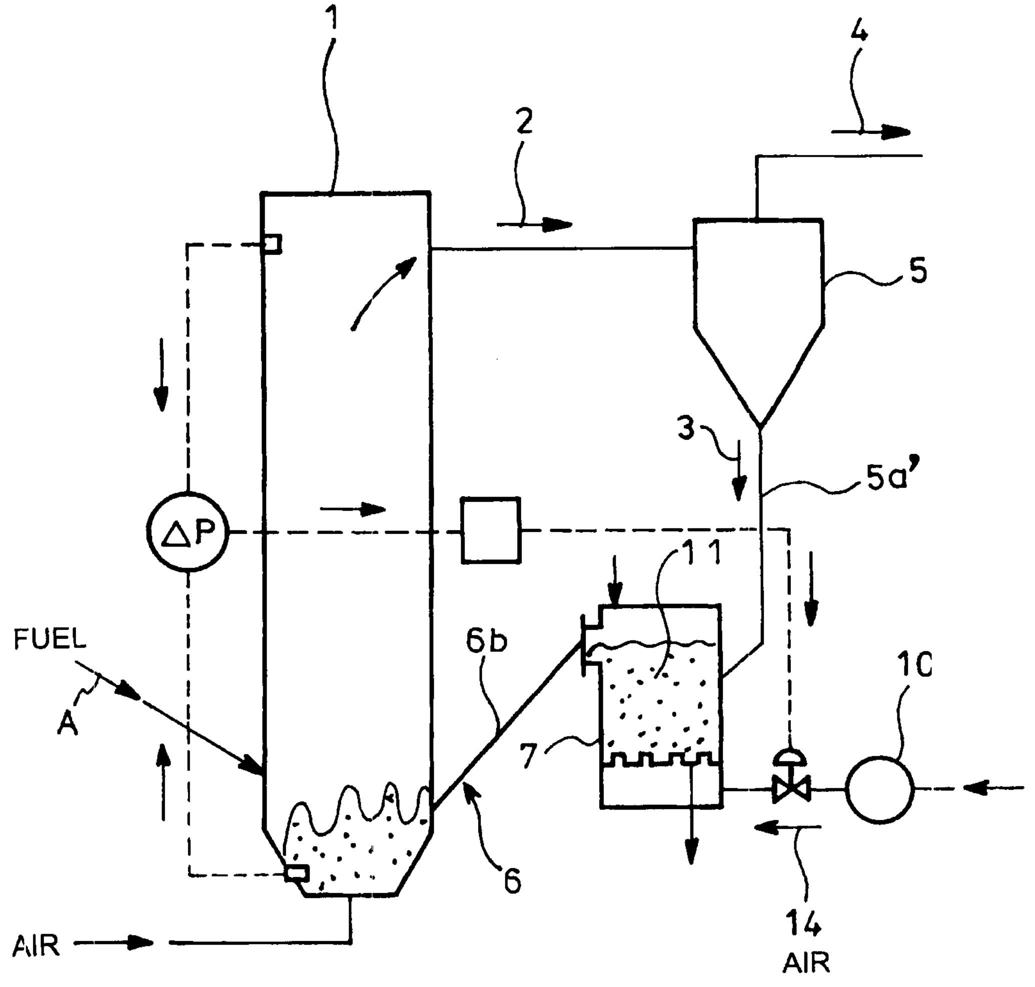
FIG. 2 PRIOR ART
FIG. 2 is a side view showing a further conventional circulating fluidized bed boiler.

100 fluidized bed combustion furnace
101 burnt gas
102 particle
103 exhaust gas
104 separator
105 fluidized bed
106 resultant gas
107 fluidized bed gasification furnace
108 lower communicating portion
109 gasification agent
110 gasification agent box
112 partition wall (partition means)
113 first chamber
113A pretreatment chamber
114 second chamber
114A gasification chamber
115 raw material supply device
116 resultant gas induction means
117 slanted pipe
118 exhaust gas induction means
119 first pressure sensor
120 preset pressure
121 first pressure controller
122 second pressure sensor
122' second pressure sensor
123 preset differential pressure
124 second pressure controller
126 particle supply device
128 particle take-out device
129 steam
130 steam induction means
131 resultant gas induction means
132 a constant taken-out flow rate controller
134 pyrolysis gas
135 pyrolysis gas induction means
M raw material
M' dehydrated raw material
M" pyrolyzed raw material

BEST MODE FOR CARRYING OUT THE INVENTION

Embodiments of the invention will be described in conjunction with attached drawings.

Figure 3:
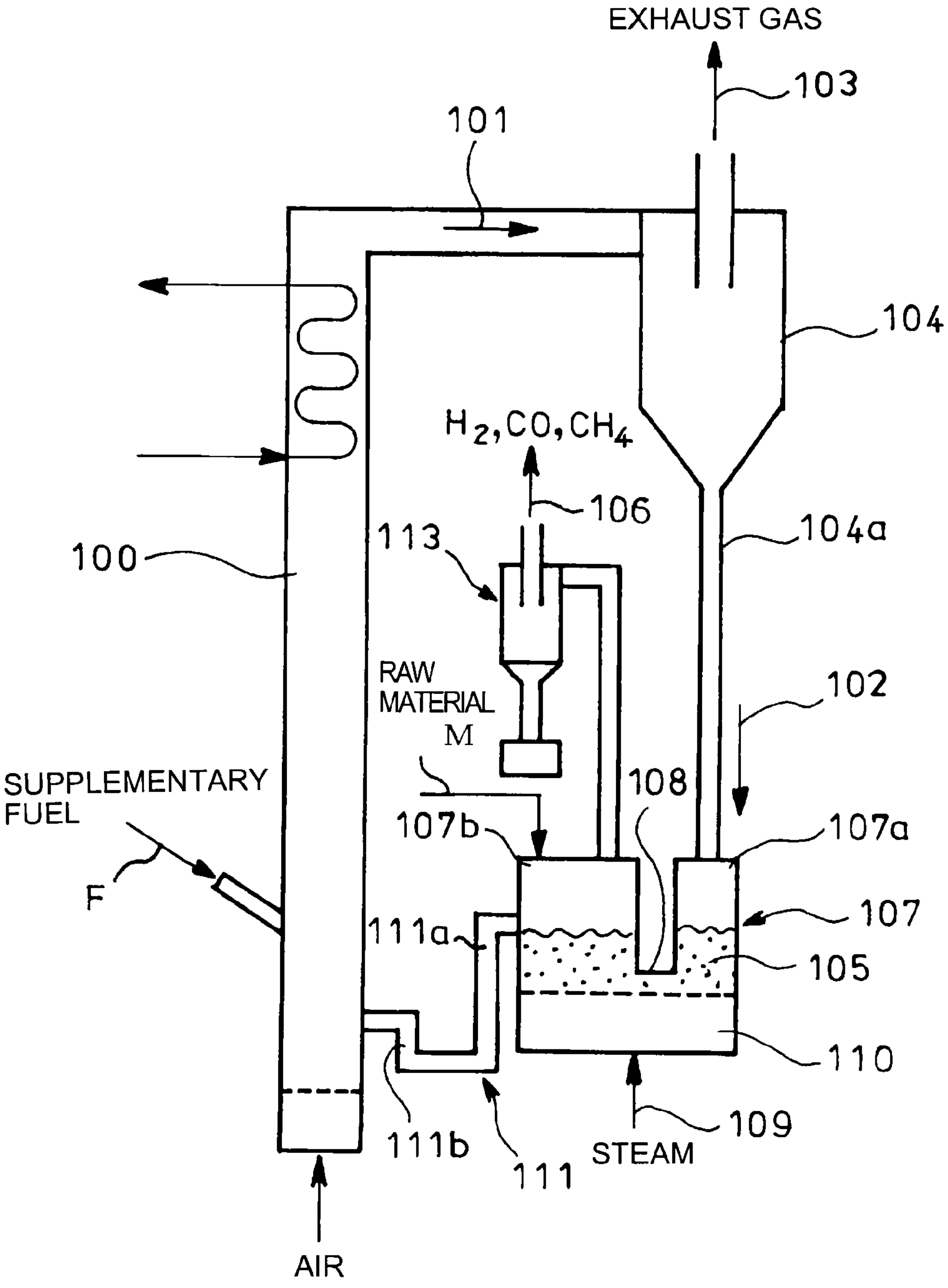
FIG. 3 is a side view showing a still further conventional circulating fluidized bed boiler.
Figure 4:
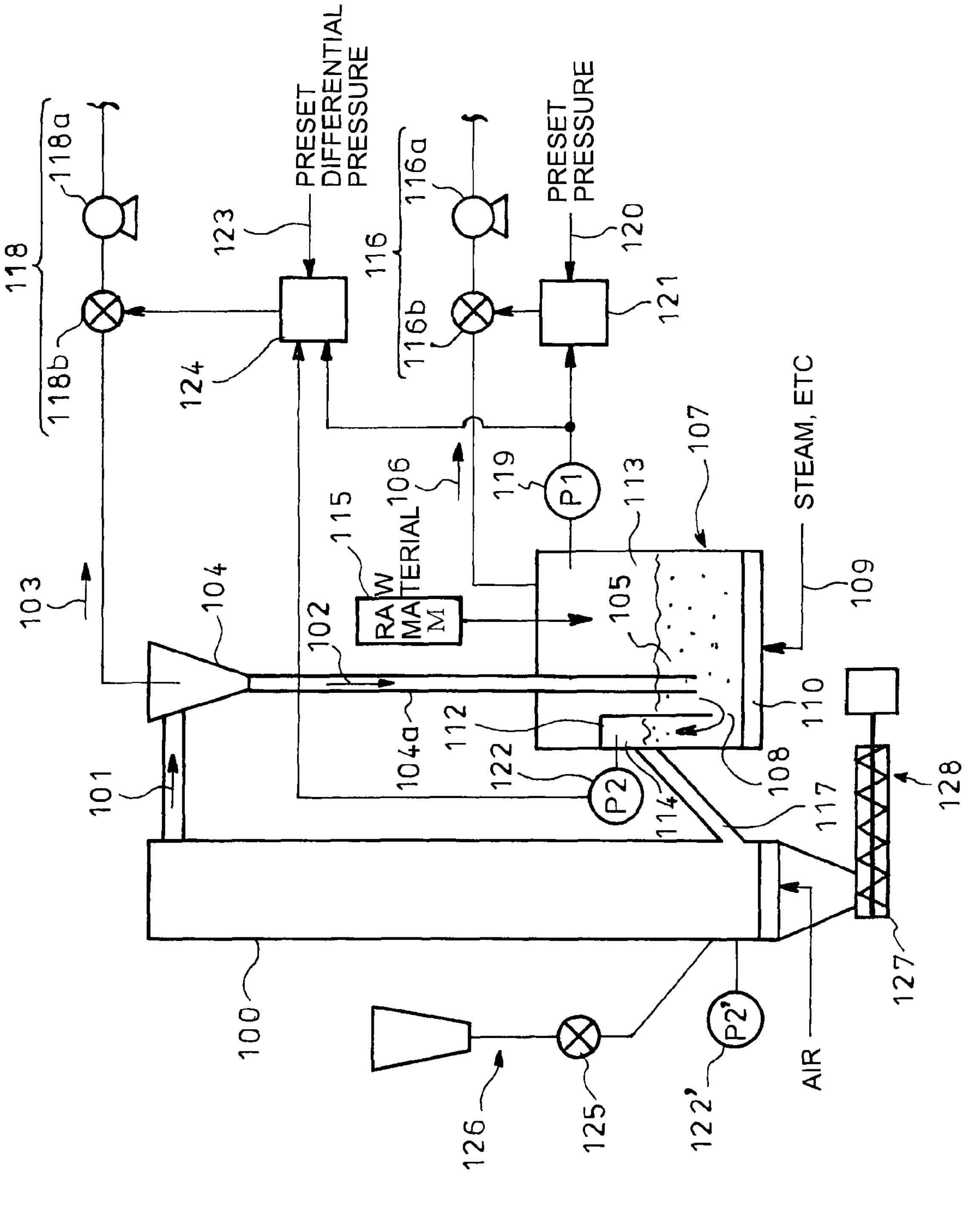
FIG. 4 is a side view showing an embodiment of the invention.

FIG. 4 shows an embodiment of the invention which is similar in fundamental construction to FIG. 3. Parts identical with those in FIG. 3 are denoted by the same reference numerals and explanations therefor are omitted; only characteristic portions of the invention will be described in detail.

A fluidized bed gasification furnace 107 shown in FIG. 4 has a gasification agent box 110 arranged below the furnace for introduction of a gasification agent 109 such as steam, air or carbon dioxide. An inside of the fluidized bed gasification furnace 107 is partitioned into first and second chambers 113 and 114 by partition means in the form of a partition wall 112 extending from above into a fluidized bed 105, the first and second chambers 113 and 114 having high- and low-volume, respectively. Formed between a lower end of the partition wall 112 and the gasification agent box 110 is a lower communicating portion 108 for communication between the first and second chambers 113 and 114 through inside of the fluidized bed 105. The partition wall 112 is preferably provided with and cooled by water-cooling means for protection against high temperature in the fluidized bed gasification furnace 107.

In the first chamber 113, hot particles 102 from a separator 104 are introduced via a downcomer 104*a* and raw material M to be gasified such as coal or other organic or other raw material is supplied through a raw material supply device 115 such as screw feeder.

In the first chamber 113, the raw material M such as coal is heated and gasified through the particles 102 in the fluidized bed 105 fluidized by a gasification agent 109, and thus resultant gas 106 is produced which mainly comprises hydrogen ($H_2$), carbon monoxide (CO), carbon dioxide ($CO_2$), methane ($CH_4$) and the like. When the raw material M is an organic raw material such as biomass, steam is concurrently produced. The resultant gas 106 is taken out outside by resultant gas induction means 116 and transferred to a destination place. The resultant gas induction means 116 in FIG. 4 comprises an induced draft fan 116*a* and an adjustable damper 116*b*.

Connected to the second chamber 114 is a slanted pipe 117 with an upper end opened at a position of the surface layer of the fluidized bed 105 and a lower end opened to an inner lower portion of a fluidized bed combustion furnace 100, the particles 102 in the second chamber 114 and char produced through the gasification being circulatorily supplied via the slanted pipe 117 to the fluidized bed combustion furnace 100.

Burnt gas 101 taken out through an upper end of the fluidized bed combustion furnace 100 is induced by an exhaust gas induction means 118 into the separator 104 where it is separated into hot particles 102 and exhaust gas 103. The exhaust gas induction means 118 in FIG. 4 comprises an induced draft fan 118*a* and an adjustable damper 118*b*.

In the above construction, a first pressure sensor 119 is provided to detect pressure in the first chamber 113, and a first pressure controller 121 is provided to control the resultant gas induction means 116 such that pressure in the first chamber 113 detected by the first pressure sensor 119 is kept to a preset pressure 120. As shown, the first pressure controller 121 may adjust an opening degree of the adjustable damper 116*b*; alternatively, the controller may adjust a rotational frequency of the draft fan 116*a*.

A second pressure sensor 122 is provided to detect pressure in the second chamber 114, and a second pressure controller 124 is provided to control the exhaust gas induction means 118 such that difference between detected pressures in the second and first chambers 114 and 113 detected by the second and first pressure sensors 122 and 119, respectively, is made equal to preset differential pressure 123. As shown, the second pressure controller 124 may adjust an opening degree of the adjustable damper 118*b*; alternatively, the controller may adjust an rotational frequency of the induced draft fan 118*a*.

Arranged laterally of the lower portion of the fluidized bed combustion furnace 100 is a particle supply device 126 for supply of new particles through, for example, a rotary feeder 125 to the furnace 100. Arranged on a bottom of the fluidized bed combustion furnace 100 is a particle take-out device 128 for take-out of the particles in the furnace 100 outside through, for instance, a screw conveyor 127.

In the embodiment shown in FIG. 4, the raw material M supplied from the raw material supply device 115 to the first chamber 113 is heated by the hot particles 102 in the fluidized bed 105 and concurrently gasified through the action of gasification agent 109 supplied from below, the gas 106 produced through the gasification being induced by the resultant gas induction means 116 to be transferred to a destination place. Since the first pressure controller 121 controls the induction through the resultant gas induction means 116 such that the pressure in the first chamber 113 detected by the first pressure sensor 119 is kept to the preset pressure 120, the resultant gas 106 at a constant flow rate is stably taken out from the first chamber 113.

As indicated by the arrow, the particles 102 and the char produced through the gasification in the first chamber 113 passes through the lower communicating portion 108 under the partition wall 112 into the second chamber 114, is supplied to the slanted pipe 117 through overflow and is circulated to the fluidized bed combustion furnace 100.

The particles 102 supplied to the fluidized bed combustion furnace 100 are heated through fluidized combustion of the char. The inside of the fluidized bed combustion furnace 100 is induced by the exhaust gas induction means 118, so that the particles in the fluidized bed combustion furnace 100 rise by means of air supplied from below and are entrained in the burnt gas 101 into the separator 104 where it is separated into the hot particles 102 and the exhaust gas 103, the particles 102 being supplied again to the first chamber 113 in the fluidized bed gasification furnace 107.

When the fluidized bed 105 in the first chamber 113 is high in height, a circulatory amount of the particles 102 to the fluidized bed combustion furnace 100 is small since the particles 102 have longer dwell time in the first chamber 113; when the fluidized bed 105 in the first chamber 113 is low in height, the circulatory amount of the particles 102 is large since the particles 102 have shorter dwell time in the first chamber 113.

Thus, the exhaust gas induction means 118 is controlled by the second pressure controller 124 such that difference between the detected pressures in the first and second chambers 113 and 114 detected by the first and second pressure sensors 119 and 122, respectively, is made equal to the preset differential pressure 123. More specifically, when the exhaust gas induction means 118 is controlled on the basis of the preset differential pressure 123 preset such that, for example, the pressure in the second chamber 114 detected by the second pressure sensor 122 is made lower than the pressure in the first chamber 113 detected by the first pressure sensor 199, then the fluidized bed 105 in the first chamber 113 is kept lower in height, so that the circulatory amount of particles 102 from the fluidized bed gasification furnace 107 to the fluidized bed combustion furnace 100 is increased. When the preset differential pressure 123 is preset greater, the circulatory amount of the particles 102 can be further increased.

When the circulatory amount of the particles 102 is increased, the particles 102 heated in the fluidized bed combustion furnace 100 and supplied to the fluidized bed gasification furnace 107 are increased in amount, the temperature in the fluidized bed gasification furnace 107 can be kept higher to enhance the gasification efficiency in the fluidized bed gasification furnace 107 and increase the gasification throughput of the raw material M, thereby increasing the production amount of the resultant gas 106.

Since the pressure in the second chamber 114 is substantially equal to the pressure in the inner lower portion of the fluidized bed combustion furnace 100, the pressure in the second chamber 114 detected by the second pressure sensor 122 may be replaced by pressure in the inner lower portion of the fluidized bed combustion furnace 100 detected by the second pressure sensor 122', the detected pressure being introduced into the second pressure controller 124 for control.

As mentioned in the above, with the pressure in the first chamber 113 being controlled to the preset pressure 120, the fluidized bed 105 in the first chamber 113 is adjusted in height to control the circulatory amount of particles 102 from the fluidized bed gasification furnace 107 to the fluidized bed combustion furnace 100, so that the circulatory amount of the particles 102 can be arbitrarily adjusted without changing the flow rate of the gasification agent 109 supplied to the fluidized bed gasification furnace 107, whereby the gasification efficiency in the fluidized bed gasification furnace 107 can be arbitrarily and stably enhanced.

In addition to the operation of controlling in height the fluidized bed 105 in the first chamber 113 by the second pressure controller 124, an operation may be conducted which supplies new particles to the fluidized bed combustion furnace 100 by the particle supply device 126. In addition to the operation of controlling in height the fluidized bed, an operation may be conducted which takes out particles in the fluidized bed combustion furnace 100 by means of the particle take-out device 128. Such addition of the operation by means of the particle supply device 126 or the particle take-out device 128 can change the amount of particles in the system and can rapidly adjust the circulatory amount of the particles.

Figure 5:
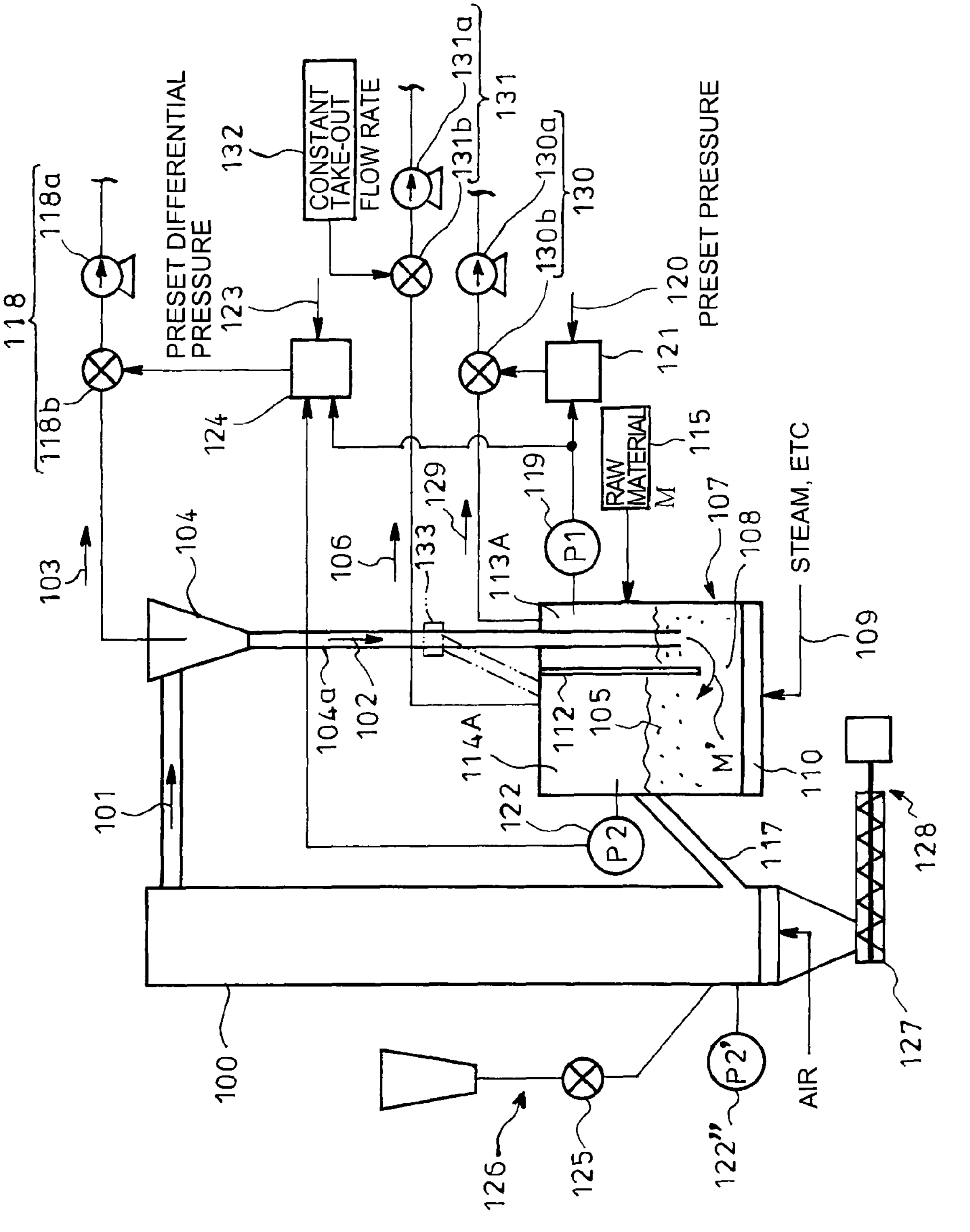
FIG. 5 is a side view showing a further embodiment of the invention.

FIG. 5 shows a further embodiment of the invention. The embodiment in FIG. 5 is different from the embodiment in FIG. 4 in that the fluidized bed gasification furnace 107 is partitioned by the partition means in the form of the partition wall 112 into first and second chambers, the former being a pretreatment chamber 113A with smaller volume whereas the latter is a gasification chamber 114A with greater volume.

In the pretreatment chamber 113A, hot particles 102 from a separator 104 are introduced and raw material M' comprising organic matter such as biomass or sludge is supplied by a raw material supply device 115, steam 129 produced through heating of the organic raw material M' in the pretreatment chamber 113A being taken out outside by steam induction means 130. The steam induction means 130 in FIG. 5 comprises an induced draft fan 130*a* and an adjustable damper 130*b*.

In the above embodiment, distribution means 133 as shown in two-dot-chain lines is preferably provided to distribute and supply the particles 102 flowing down through a downcomer 104*a* from the separator 104 into the pretreatment and gasification chamber 113A and 114A, thereby adjusting a supplied amount of the particles 102 so as to make temperature in the pretreatment chamber 113A suitable for dehydration of the organic raw material M'.

A first pressure controller 121, into which inputted is detected pressure from a first pressure sensor 119 for pressure detection of the steam 129 in the pretreatment chamber 113A, controls the steam induction means 130 so as to keep the detected pressure in the pretreatment chamber 113A to a preset pressure 120. The first pressure controller 121 may adjust, as shown in FIG. 5, an opening degree of the adjustable damper 130*b*; alternatively, the controller may adjust a rotational frequency of the induced draft fan 130*a*.

On the other hand, introduced into the second chamber or gasification chamber 114A is the dehydrated raw material M' in the pretreatment chamber 113A in such a manner that it passes under the lower end of the partition wall 112. Gas 106 produced through gasification of the raw material M' by the hot particles 102 and a gasification agent 109 is taken out outside by resultant gas induction means 131 and transferred to a destination place. The resultant gas induction means 131 in FIG. 5 comprises an induced draft fan 131*a* and an adjustable damper 131*b*. The resultant gas induction means 131 takes out the resultant gas 106 always at a constant flow rate from the gasification chamber 114A, using a constant taken-out flow rate controller 132.

Furthermore, the pressures in the gasification and pretreatment chambers 114A and 113A detected by the second and first pressure sensors 122 and 119, respectively, are inputted into a second pressure controller 124, and induction of exhaust gas induction means 118 is controlled such that difference in pressure between the chambers 113A and 114A is made equal to a preset differential pressure 123.

According to the embodiment in FIG. 5, the organic raw material M is supplied to the pretreatment chamber 113A so that the steam is produced and pressure in the pretreatment chamber 113A is about to rise. However, the pressure in the pretreatment chamber 113A is kept constant since the first pressure controller 121 controls the induction of the steam by the steam induction means 130 such that the pressure in the pretreatment chamber 113A detected by the first pressure sensor 119 is kept to the preset pressure 120.

The raw material M' dehydrated in the pretreatment chamber 113A passes under the lower end of the partition wall 112 into the gasification chamber 114A where it is gasified through the gasification agent 109, resultant gas 106 produced through the gasification is taken out outside by the resultant gas induction means 131. The take-out of the resultant gas 106 from the gasification chamber 114A is conducted always at a constant flow rate by the constant taken-out flow rate controller 132 provided for the resultant gas induction means 131.

In this state, when the exhaust gas induction means 118 is controlled on the basis of the preset differential pressure 123 preset such that the pressure in the gasification chamber 114A detected by the second pressure sensor 122 is lower than the pressure in the pretreatment chamber 113A detected by the first pressure sensor 119, then the fluidized bed 105 is kept lower in height, so that the circulatory amount of the particles 102 supplied from the fluidized bed gasification furnace 107 to the fluidized bed combustion furnace 100 is increased.

In the embodiment in FIG. 5, the dehydrated organic raw material M' in the pretreatment chamber 113A is supplied to the gasification chamber 114A for gasification, so that the resultant gas free from the steam can be taken out from the gasification chamber 114A.

Figure 6:
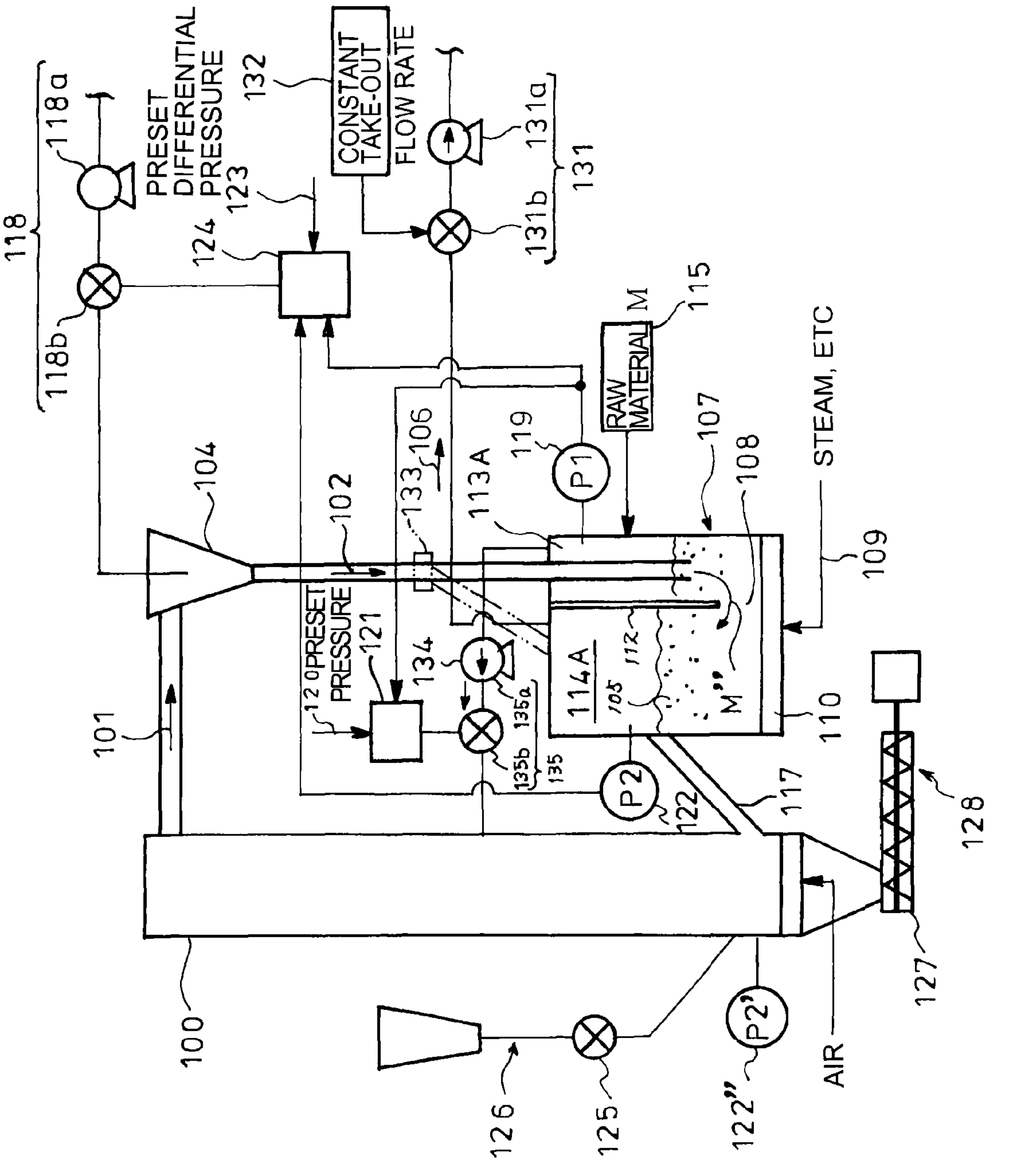
FIG. 6 is a side view showing a still further embodiment of the invention.

FIG. 6 shows a still further embodiment of the invention which is a modification of the system in FIG. 5. The embodiment in FIG. 6 is different from the embodiment in FIG. 5 in that the organic raw material M is heat-treated in the pretreatment chamber 113A up to a temperature where the raw material is pyrolyzed. For example, distribution means 133 as shown in dotted lines is provided to adjust the amount of the particles 102 to be supplied to the pretreatment and gasification chambers 113A and 114A. In the pretreatment chamber 113A, the amount of particles 102 to be supplied and dwell time of the raw material M' in the pretreatment chamber 113A are controlled such as the pyrolysis gas 134 comprising components containing hydrocarbon (CH) such as methane ($CH_4$) or tar and other components such as carbon monoxide (CO), carbon dioxide ($CO_2$) or hydrogen ($H_2$) is produced through the pyrolysis of the organic raw material M'. The dwell time of the raw material M' can be preset by the pressure in the pretreatment chamber 113A. In the gasification chamber 114A, the pyrolysis gas 134 is produced together with steam.

The pyrolysis gas 134 and steam produced in the pretreatment chamber 113A are taken out outside by the pyrolysis gas induction means 135. FIG. 5のPyrolysis gas induction means 135 in FIG. 5 comprises an induced draft fan 135*a* and an adjustable damper 135*b*.

In the embodiment in FIG. 6, the pyrolysis gas 134 taken out by the pyrolysis gas induction means 135 from the pretreatment chamber 113A is supplied to the fluidized bed combustion furnace 100 as fuel for heating of particles in the fluidized bed combustion furnace 100.

The first pressure controller 121, into which is introduced the detected pressure from the first pressure sensor 119 for detecting the pressure of the pyrolysis gas 134 in the pretreatment chamber 113A, controls the pyrolysis gas induction means 135 such that the detected pressure in the pretreatment chamber 113A is kept to the preset pressure 120.

On the other hand, introduced into the gasification chamber 114A is the raw material M" pyrolyzed in the pretreatment chamber 113A and passing under the lower end of the partition wall 112. Then, the raw material M" is gasified through heating by the particles 102 and gasification reaction by the gasification agent 109. In the case of steam gasification, resultant gas 106 is produced which comprises carbon monoxide (CO) and hydrogen ($H_2$). The resultant gas 106 is taken out outside by the resultant gas induction means 131 and transferred to a destination place. The resultant gas induction means 131 comprises an induced draft fan 131*a* and an adjustable damper 131*b*. The take-out of the resultant gas 106 by the resultant gas induction means 131 is conducted always by a constant amount, using a constant taken-out amount controller 132.

Furthermore, the detected pressure in the gasification chamber 114A detected by the second pressure sensor 122 and the detected pressure in the pretreatment chamber 113A detected by the first pressure sensor 119 are input into the second pressure controller 124 which control the induction of the exhaust gas induction means 118 such that difference between the pressures in the pretreatment and gasification chambers 113A and 114A is equal to the preset differential pressure 123.

In the system in FIG. 6, the exhaust gas induction means 118 is controlled on the basis of the preset differential pressure 123 preset in the second pressure controller 124 such that the detected pressure in the gasification chamber 114A detected by the second sensor 122 is lower than the detected pressure in the pretreatment chamber 113A detected by the first pressure sensor 119, so that the fluidized bed 105 in the pretreatment chamber 113A is kept lower in height, whereby the amount of particles 102 to be supplied for circulation from the fluidized bed gasification furnace 107 to the fluidized bed combustion furnace 100 is increased.

Further, in the system in FIG. 6, the pyrolysis gas and the steam are separated in the pretreatment chamber 113A, so that the pyrolysis treated raw material M" is gasified in the gasification chamber 114A and high-grade resultant gas 106 comprising carbon monoxide (CO) and hydrogen ($H_2$) can be produced and taken out.

The pyrolysis gas 134 produced in the pretreatment chamber 113A is supplied to the fluidized bed combustion furnace 100 by the pyrolysis gas induction means 135, so that the pyrolysis gas 134 is utilized for heating of the particles in the fluidized bed combustion furnace 100, which can further enhance the temperature of the particles and thus further enhance the gasification efficiency in the fluidized bed gasification furnace 107.

It is to be understood that various changes and modifications may be made to an system for controlling an amount of particles to be circulated in a circulating fluidized bed furnace according to the invention. For example, the system may be applicable to gasification of various organic raw materials.

The invention claimed is:

1. A system for controlling an amount of particles to be circulated in a circulating fluidized bed gasification furnace and a fluidized bed combustion furnace wherein the particles are introduced together with char produced through gasification of raw material are introduced into a fluidized bed combustion furnace to heat the particles through fluidized combustion of the char, burnt gas taken out from the fluidized bed combustion furnace by exhaust gas induction means being introduced into a separator where the gas is separated into exhaust gas and the particles, the separated hot particles and the raw material being supplied to a fluidized bed gasification furnace into which a gasification agent is introduced, the raw material being gasified by a fluidized bed in the gasification furnace, resultant gas generated through gasification of the raw material being taken out from the fluidized bed gasification furnace by a resultant gas induction means, the particles and char produced through gasification of the raw material being circulated to the fluidized bed combustion furnace, said system comprising said fluidized bed gasification furnace partitioned by partition means into first and second chambers in communication with each other at a lower communicating portion in the fluidized bed, the hot particles from the separator and raw material being introduced into the first chamber, said second chamber for supplying char and particles introduced from said first chamber via the lower communicating portion below the partition means to the fluidized bed combustion furnace through overflow, a first pressure sensor for detecting pressure in the first chamber, a second pressure sensor for detecting pressure in the second chamber, a first pressure controller for controlling the resultant gas induction means so as to keep the pressure in the first chamber to preset pressure and a second pressure controller for controlling the exhaust gas induction means so as to make difference in pressure between the first and second chambers to preset differential pressure, whereby the fluidized bed in the first chamber is adjusted in height to control an amount of particles to be circulated.

2. A system for controlling an amount of particles to be circulated in a circulating fluidized bed gasification furnace and a fluidized bed combustion furnace as claimed in claim 1, wherein the first chamber is a gasification chamber of the raw material, gas produced through gasification of the gasification chamber being capable of being taken out by the resultant gas induction means at preset pressure and the particles and char produced through the gasification are introduced into the second chamber through the lower communicating portion below the partition means.

3. A system for controlling an amount of particles to be circulated in a circulating fluidized bed gasification furnace and a fluidized bed combustion furnace as claimed in claim 1, wherein the first and second chambers are a pretreatment chamber for raw material and a gasification chamber for the pretreated raw material, respectively, processed gas produced in the pretreatment in the pretreatment chamber being taken out at preset pressure by a processed gas induction means, the pretreated raw material and the particles being introduced into the gasification chamber through the lower communicating portion below the partition means, gas produced through the gasification in the gasification chamber being taken out at a constant take-out flow rate by the resultant gas induction means.

4. A system for controlling an amount of particles to be circulated in a circulating fluidized bed gasification furnace and a fluidized bed combustion furnace as claimed in claim 3, wherein the processed gas is steam produced by heating of raw material.

5. A system for controlling an amount of particles to be circulated in a circulating fluidized bed gasification furnace and a fluidized bed combustion furnace as claimed in claim 3, wherein the processed gas is pyrolysis gas produced by heating of raw material.

6. A system for controlling an amount of particles to be circulated in a circulating fluidized bed gasification furnace and a fluidized bed combustion furnace as claimed in claim 5, wherein the pyrolysis gas is supplied as fuel for heating of the particles to the fluidized bed combustion furnace.

7. A system for controlling an amount of particles to be circulated in a circulating fluidized bed gasification furnace and a fluidized bed combustion furnace as claimed in claim 1, wherein the fluidized bed combustion furnace is provided with a particle supply device for supply of new particles.

8. A system for controlling an amount of particles to be circulated in a circulating fluidized bed gasification furnace and a fluidized bed combustion furnace as claimed in claim 1, wherein the fluidized bed combustion furnace is provided with a particle take-out device for take-out of the particles.

* * * * *